United States Patent [19]

Strauss et al.

[11] 3,996,036
[45] Dec. 7, 1976

[54] APPARATUS FOR MOVING GLASS PANES THROUGH AN INSTALLATION HAVING A PLURALITY OF STATIONS

[76] Inventors: Gottfried Strauss, Durer-Strasse 24, Heiligenhaus; Horst Schumann, Dusseldorfer Strasse 72, 403 Ratingen, both of Germany

[22] Filed: May 7, 1975

[21] Appl. No.: 575,177

[30] Foreign Application Priority Data

May 7, 1974 Germany .......................... 2421940

[52] U.S. Cl. .................................. 65/273; 65/275; 65/349; 104/27; 198/339; 198/859; 294/116
[51] Int. Cl.² .................. C03B 23/02; C03B 27/00
[58] Field of Search .............. 65/58, 273, 275, 348, 65/349, 350, 351; 198/76; 104/27; 294/116

[56] References Cited

UNITED STATES PATENTS

| | | | |
|---|---|---|---|
| 2,476,734 | 7/1949 | Jellison | 294/116 X |
| 3,097,943 | 7/1963 | Dean et al. | 65/58 |
| 3,545,804 | 12/1970 | Richner | 294/116 |

FOREIGN PATENTS OR APPLICATIONS 1,257,673   1/1966   Germany

Primary Examiner—Arthur D. Kellogg

[57] ABSTRACT

Apparatus for moving glass panes through an installation having a plurality of stations, having a conveyor, movable in a stepwise manner along a first path, a stepping drive movable along a second path extending parallel to said first path over a portion of the latter in the area of the stations, independently of the conveyor, the glass panes, being carried by a member which can be detachably connected selectively to the conveyor and to the stepping drive in the area of said second path.

2 Claims, 6 Drawing Figures

APPARATUS FOR MOVING GLASS PANES THROUGH AN INSTALLATION HAVING A PLURALITY OF STATIONS

BACKGROUND

The invention relates to an apparatus for the periodical movement of glass panes dependingly fastened to carrier means through a heating oven, especially for the transportation of panes through the various stations of a glass toughening or tempering installation in which the carrier means are cyclically movable by a conveyor means extending over the entire transport path.

Apparatus of this kind, whose manner of operation is described, for example, in German "Offenlegungsschrift" 2,146,518, serve for the purpose of conveying the dependingly fastened glass panes through the various stations of the glass toughening installation — for example, one comprising a single oven for the production of bent panes, in which a glass pane attaching station, an oven chamber, a bending station with a press, an air quenching station, and a glass pane removal or offbearing station are arranged in succession. The intervals between the individual stations must, of course, be of equal length and must correspond to one step of the periodical transport movement of the conveyor means, so that the glass panes suspended from the carrier means will arrive successively precisely at the correct point within the various stations. In the interest of preventing the glass preheated in the oven from cooling before it is introduced into the press, the distance between the oven and the bending station is kept as small as possible. If this distance were unnecessarily great, the result would be that particularly large, thin panes would cool to a disproportionately great extent in the outside air, since in this case the mass of the glass, and hence the amount of stored heat, is relatively low, so that the plasticity of the glass would no longer be sufficient for the mechanical forming thereof in the press (bending station).

The result of this, of course, is that the distance covered by the conveyor means in each individual step is adjusted to the distance between the oven and the press. The distance between the glass pane attaching station and the oven is generally greater than the distance between the oven and the bending station, so that a freshly appended pane does not enter right away into the oven, but during the first step, that is, the step during which a pane in the oven is being carried into the bending station and then into the air quenching station, it remains hanging ahead of the oven during the short stay of the preceding pane in the bending station, and it is not introduced into the oven until the preceding pane has been pressed and moves on.

Apparatus of the kind described above, in which the cycle of the conveyor means is adjusted to the distance between the oven and the bending station, have proven entirely effective in toughened-glass installations having a single oven chamber. However, in order to improve the uniformity of the heating of the panes and at the same time to enable them to be heated more rapidly, recourse has been taken to toughened-glass installations having a plurality of successively disposed oven chambers. When the conveying system described above is used, the disadvantage is now encountered that when, on the basis of the given cycle of the conveyor means, a fully heated pane is moved from the last oven chamber into the bending station and on into the air quenching station, the panes which are still hanging in the train of ovens have to be unnecessarily accelerated and decelerated again, which can result in oscillating movements due to the known problems involved in the hanging of the panes, with the disadvantageous consequences that result therefrom. Furthermore, such repeated acceleration and deceleration of the heated panes is also disadvantageous because the tongs which hold the panes then penetrate more deeply into the glass, resulting in the formation of "ears," or of starting points from which cracks may propagate later on. There is also the danger that the panes which are in the train of ovens may be left hanging briefly between two successive oven chambers during a step of the conveyor means corresponding to the movement of the pane in the last oven to the bending station, resulting in a loss of heat.

In like manner, problems occur even in toughened-glass installations for the production of flat glass when a plurality of oven chambers are used and panes of varying thickness are to be treated, requiring different periods of time in the individual oven chambers. The use of the known apparatus at a rhythm of movement of the panes through the toughened-glass installation which is determined by the movement of the conveyor means will then necessarily bring it about that, whenever the rhythm is set for the heating time required for panes of great thickness (approximately 50 to 60 seconds of heating time are required per millimeter of glass thickness), thin panes will remain too long in the oven, thereby becoming undesirably hot.

THE INVENTION

The invention is addressed to the problem of creating an apparatus of the kind described in the beginning, which will permit the glass panes to be conveyed through the various treatment stations such that not only will the point at which the panes are located during the cyclic pauses be precisely correct, but also it will be possible to optimize the time of stay at each station independently of the other stations.

This problem is solved in accordance with the invention, in an apparatus of the kind described, by the fact that alongside a section of the conveyor means comprising at least two stations, an additional stepping drive which can be operated cyclically independently of the conveyor means is disposed parallel to the conveyor means, and that the carrier means are selectively able to be attached matingly, in a releasable manner, to the conveyor means or to the stepping drive within the operating area of the stepping drive.

A preferred embodiment of the invention is characterized by the fact that the cyclic movement of the conveyor means and of the stepping drive, and the attachment of a particular carrier means to the conveyor means or to the stepping drive, are automatically controllable in a timed manner. It may furthermore be desirable for the conveyor means to consist of a horizontally circulating endless chain, that adjacent the endless chain an endless guiding means be provided for the support of the carrier means consisting each of a carriage, and that, on the side of the endless guiding means facing away from the endless chain an additional guiding means be provided in the area of operation of the stepping drive, in which the stepping drive can be operated.

Additional preferred embodiments will be described in the subordinate claims.

The apparatus of the invention makes it possible, in toughened-glass installations designed for the production of bent glass panes and having a plurality of oven chambers, for example, to transport the carrier means with the glass panes from the pane attaching station all the way to the last oven chamber by means of the endless conveyor. In the oven chamber the carrier means will then be taken over by the stepping drive, which then will transport the carrier means holding the glass pane from the final oven chamber to the bending station and from there to the air quenching station where it will again be taken over by the circulating conveyor means.

In toughened-glass installations for the production of flat glass products, such as for example tempered, all-glass doors, in which a plurality of oven chambers are used, the stepping drive provided in accordance with the invention and operable independently of the basic operating cycle of the endless conveyor means can take over the glass bearing carrier means from the endless conveyor means in the first oven chamber and transport it through the rest of the oven chambers as far as the air quenching station, where the said carrier means is again taken over by the endless, circulating conveyor means.

In toughened-glass installations for the production of bent sheet-glass products, therefore, the stepping drive will take over the carrier means with the glass pane depending therefrom and move the glass into the bending station while the circulating conveyor means, independently thereof, and in the steady basic rhythm, will transport the other glass panes hanging from other carrier means from one oven chamber into the next. After the carrier means leaves the press (bending station), the stepping drive will carry it through the air quenching station to the workpiece removal station where the pane is removed and at the same time the unloaded carrier means is released from the stepping drive and re-connected to the circulating endless conveyor means. The stepping drive then returns to the last oven chamber and, on the basis of its pre-set rhythm, takes over the glass pane that has in the meantime entered that chamber.

In the case of toughened-glass installations for the production of flat glass products, if it is desired to allow pieces of different thickness to remain for an optimum period of time in the various oven chambers, making it possible to allow pieces of greater thickness, which require a longer heating time than those of lesser thickness, to remain for a corresponding period of time in an oven chamber, the automatic control of the circulating endless conveyor means is shut off. The stepping drive will then assume control of the timing of the installation to allow for the heating time required in each case for pieces of various thickness. In the meantime the conveyor means is adapted to the rhythm of operation of the stepping drive. In other words, the rhythm of operation of the conveyor means and the rhythm of the stepping drive are not, in this case, independent of one another but are automatically coupled, if desired, by a controlling means; however, the rhythm of operation of the stepping drive is determinative.

Additional features and advantages of the invention will be seen in the claims and in the following description in which two embodiments of the invention will be explained in detail with the aid of the drawing, wherein:

Figure 1:
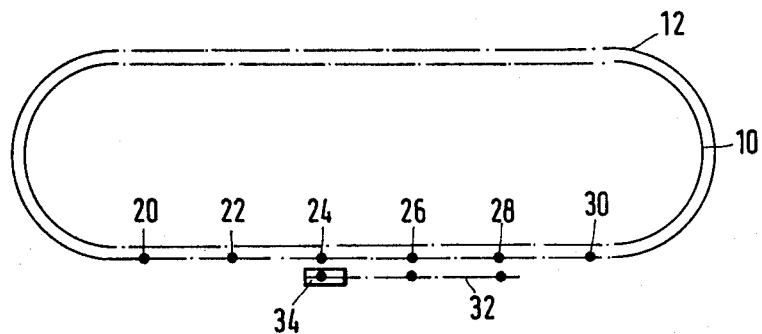
FIG. 1 is a diagrammatic top plan view of a toughened-glass installation for the production of bent glass panes, which has a plurality of treatment stations and the stepping drive which, in accordance with the invention, functions adjacent to and parallel with the circulating conveyor means.

FIG. 1 is a diagrammatic representation of a toughened-glass installation for the production of bent glass sheets, in which an endless guiding means 12 consisting of an endless track is provided parallel to an endless circulating chain. On the endless track 12 conveyor carriages 14 (see FIG. 3) run on wheels, and glass panes 18 are supported thereon by means of tongs 16 in the manner described, for example, in German "Offenlegungsschrift" 2,146,518. The endless guiding means 12 can, of course, also consist of a roller train, in which case the conveyor carriages would accordingly be supported on the rollers by runners.

By means of the conveyor carriages 14, the glass panes dependingly attached thereto can be transported from an attaching station 20 through oven chambers 22 and 24 to a bending station 26 equipped with a press, and then on to an air quenching station 28 and finally to a glass pane removing station 30.

As indicated in FIG. 1, there extends parallel to the endless guiding means 12, from the area of the second oven 24 to the air quenching station 28, in the manner provided by the invention, an additional guiding means 32 along which a stepping drive 34 can be operated.

Figure 2:
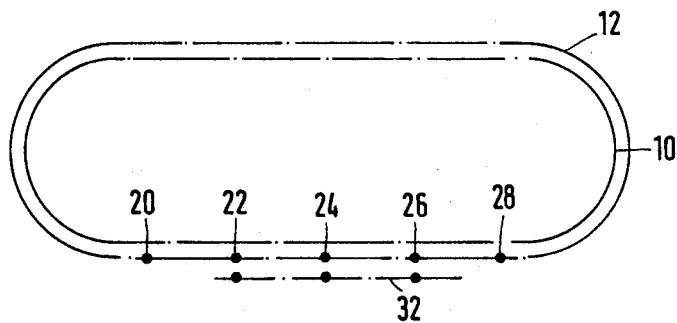
FIG. 2 is a view similar to FIG. 1 of a toughened-glass installation for the production of flat glass products.

FIG. 2 shows in the same manner as FIG. 1 a toughened-glass installation for the production of flat glass panes, which differs from the toughened-glass installation for the production of bent sheet glass of FIG. 1 only in that no bending station is provided, so that the air quenching station 28 is disposed directly following the last (second) oven 24. The stepping drive 34 in this case can be operated, for the reasons to be explained further on, along an additional guiding means 32 extending from the first oven to the air quenching station 28.

Figure 3:
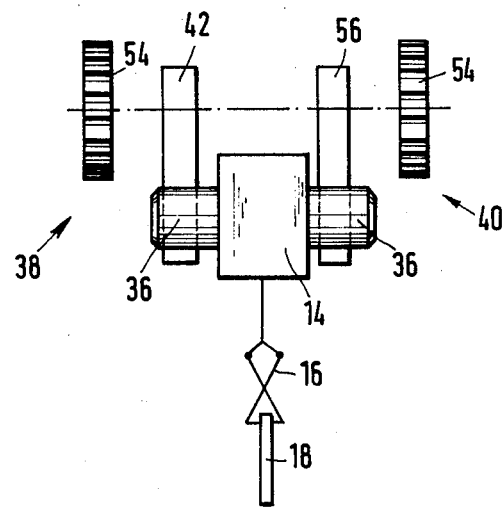
FIG. 3 is a front elevational view of a conveyor carriage with a glass pane dependingly attached thereto, and the associated entraining means for the circulating endless conveyor means and the stepping drive.

As FIG. 3 indicates, the diagrammatically represented conveyor carriage 14 has a transport pin 36 which extends transversely of the direction of transport, and hence transversely of the endless chain 10 and endless guiding means 12, and which projects on both sides into the reach of the endless chain 10 on the one hand and the additional guiding means 32 on the other, and hence into the reach of the stepping drive 34. Entraining means 38 and 40, which will be further described below, and which are controllable by actuating means, can be brought selectively into engagement with the transport pin 36, one at each end thereof.

Figure 4:
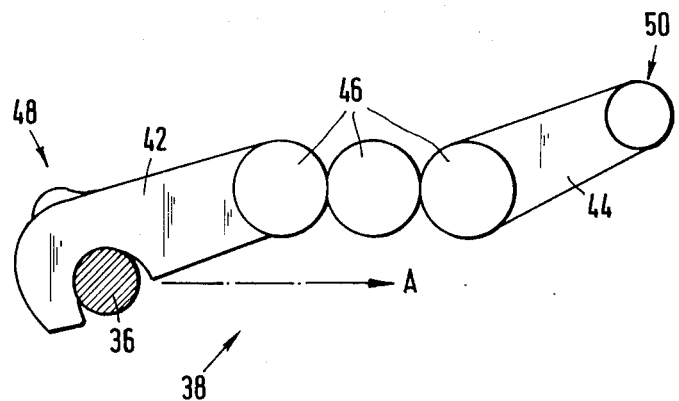
FIG. 4 is a side elevational view of the pawl means for connecting the transport pin of the conveyor carriage to the circulating endless conveyor means.

The entraining means 38, which is represented in detail in FIG. 4, and serves for the releasable, mating connection of the conveyor carriage 14 to the endless chain, has two pawls 42 and 44 which, in the manner represented in FIG. 4, are interconnected with one another through gears 46 such that, when pawl 42 is acted upon by an actuating means 48 generally indicated by the arrow 48, which exerts a pressure against said pawl, not only will the pawl 42 be brought into engagement with the transport pin 36 of the conveyor carriage, but also, and on the other hand, a pressure exerted on pawl 44 by a second actuating means 50 will again lift pawl 42 and thus disengage the transport pin 36 of conveyor carriage 14. The direction of transport or conveyance is indicated in FIG. 4 by the arrow A. A plurality of the entraining means 38 represented in detail in FIG. 4 are located on the endless chain 10, the actuating means 48 and 50 being disposed in a stationary manner.

Figure 5:
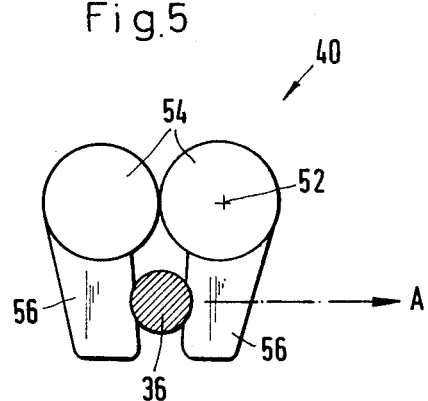
FIG. 5 is a side elevational view from the left side of FIG. 3 showing the entraining means of the stepping drive, the said entraining means being joined to the transport pin of the conveyor carriage.
Figure 6:
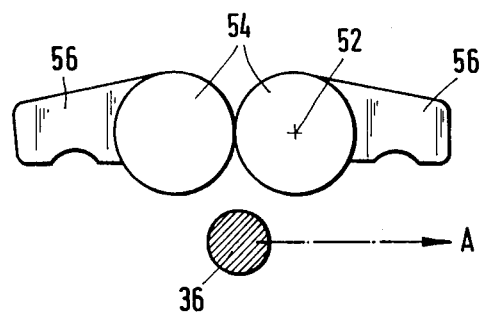
FIG. 6 shows the entraining means of the stepping drive, represented in the same way as in FIG. 5, but in a position in which the transport pin of the conveyor carriage is released.

FIGS. 5 and 6 show the entraining means 40 for connecting the transport pin 36 of conveyor carriage 14 to the stepping drive 34, which is preferably in the form of a carriage having a motor to drive it back and forth along the endless guiding means 12 plus an additional motor for the actuation of the entraining means 38 and 40. The entraining means 40 has two jaws 56 which can be operated by a rotary actuating means 52 and corresponding gears 54, the said jaws gripping the transport pin 36 in the position represented in FIG. 5, and releasing it in the position shown in FIG. 6.

The manner of operation of the apparatus of the invention will now be explained with the aid of FIGS. 1 and 3, in connection with a toughened-glass installation for the production of bent panes of glass. In the toughened glass installation shown in FIG. 1, for the production of bent panes of glass, glass panes 18 are suspended in the tongs 16 of conveyor carriage 14 at the attaching station 20. The conveyor carriage, meantime, is positively joined to the endless chain 10 by the engaged entraining means 38. In the periodical or cyclic forward movement of the endless chain 10, a pane attached at the attaching station 20 is then transported in the first cycle into the first oven chamber 22, and in the next cycle into the second oven chamber 24. There the actuating means 50 of the stepping drive 34 actuates the entraining means 38 such that the pawl 42 releases the transport pin 36 of the conveyor carriage 14. At the same time the entraining means 40 is actuated by the rotary actuator 52 such that the jaws 56 grip the transport pin 36; thus, the mating connection attaching the conveyor carriage with the glass pane dependingly fastened thereto to the endless chain 10 is released, and instead a mating connection to the stepping drive 34 operating in additional guiding means 32 is made. Independently of the continued periodical movement of the endless chain 12, the stepping drive 34 now transports the glass pane hanging from conveyor carriage 14 into the bending station 26 where only a short stay is required, and then into the air quenching station 28 where, by a reversed actuation of the entraining means 38 and 40 the glass pane is again taken over by the endless chain 10 for continued cyclic movement to the detaching station 30.

The operation of the toughened-glass installation shown in FIG. 2 for the production of flat glass panes is, of course, entirely analogous to the above-described operation of the installation for the production of bent glass panes, with the exception that here the pane or conveyor carriage is transferred in the first oven chamber 22 from the endless chain 10 to the stepping drive 34, and then, in the same manner as in FIG. 1, it is coupled again to the endless chain 10 in the air quenching station 28.

It is also to be remarked that an especially advantageous operation of the stepping drive 34 can be achieved if its movement along the additional guiding means 32 is effected by means of a jerk-free drive such as the one described in German "Offenlegungsschrift" 2,146,518.

The features of the invention disclosed in the above description, in the drawing, and in the following claims can be of importance both individually and in any desired combination for the realization of the invention in its various embodiments.

What we clim:

1. An apparatus for moving glass panes in a step-wise manner through a plurality of working stations arranged horizontally one behind the other and having at least a furnace, a bending station and a blowing station; said apparatus comprising: a plurality of carriages, each adapted to removably suspend a glass pane; horizontally extending, endless first guiding means for supporting said carriages and extending over a path including all of said stations; endless conveyor means operating in a first step-wise manner and extending adjacent to and parallel to said endless guiding means over the entire path thereof; means provided at said carriages for connecting the same with said conveyor means; a first stepping drive for moving said conveyor means in a first step-wise manner such that said conveyor means and thereby said carriages come to a rest in an exactly defined position at the beginning and at the end of each step in one of the stations; second guiding means provided along at least a section of said conveyor means and extending over at least two stations, said second guiding means being arranged parallel to said conveyor means and on that side thereof which faces away from said first guiding means; an auxiliary carriage supported on said second guiding means; a drive motor forming a second stepping drive for moving said auxiliary carriage independently of the step-wise movement of said conveyor means; said drive motor being adapted to reciprocate said auxiliary carriage between selected stations located within the range of said second guiding means, in a second, freely selected, step-wise manner between stations relative to said conveyor means, in exactly defined positions; each carriage being provided with two extensions extending respectively in opposite directions, one extending into the range of said conveyor means and the other into the range of said second guiding means; said conveyor means comprising a plurality of first follower devices spaced from each other a distance corresponding to the distance between said stations; each of said first follower devices being adapted to be brought respectively and selectively into engagement with and disengagement from the respective extension; located within the range of said second guiding means and aligned therewith, in each of the stations; said auxiliary carriage being provided with a second follower device adapted to be brought into selective engagement with and disengagement from the respective projection of the respective carriage, located within the range of said second guiding means and aligned therewith, in each of the stations, but opposite to the respective first follower device; said auxiliary carriage being provided with a first actuating device for engaging and disengaging said first follower device with the respective projection of the respective carriage, and with a second actuating device for engagement and disengagement of the second follower device with the respective projection; a control motor carried by said auxiliary carriage for simultaneously activating said first and said second actuating devices; and time control means for automatically and timely actuating said first stepping drive for said endless conveyor means, of said drive motor for said auxiliary carriage, and of said control motor for activating said first and second actuating devices.

2. An apparatus according to claim 1, wherein said conveyor means comprises an endless chain; said endless first guiding means and said second guiding means comprising rails for respectively supporting said carriages and said auxiliary carriage via rollers; said extensions of said carriages being formed by bolts respectively extending transversely to the direction of movement of said carriages and respectively extending on opposite sides into the range of said follower devices; each of said first follower devices comprising two follower pawls pivotal about parallel axes, said pawls being interconnected via gears; said first actuating device comprising pressure impulse members respectively actuating one of said pawls and activated by said control motor of said auxiliary carriage; said second follower device on said auxiliary carriage comprising jaw means; said second actuating device comprising rotary actuating means activated by said control motor of said auxiliary carriage.

* * * * *